P. BOYDEN.
BREAST-COLLARS FOR HARNESS.
No. 188,097. Patented March 6, 1877.
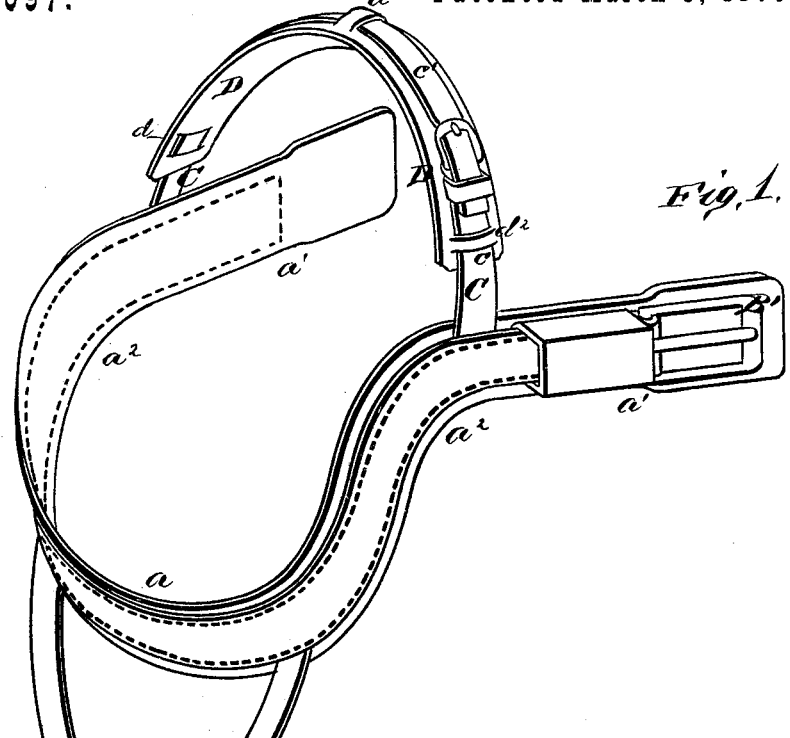
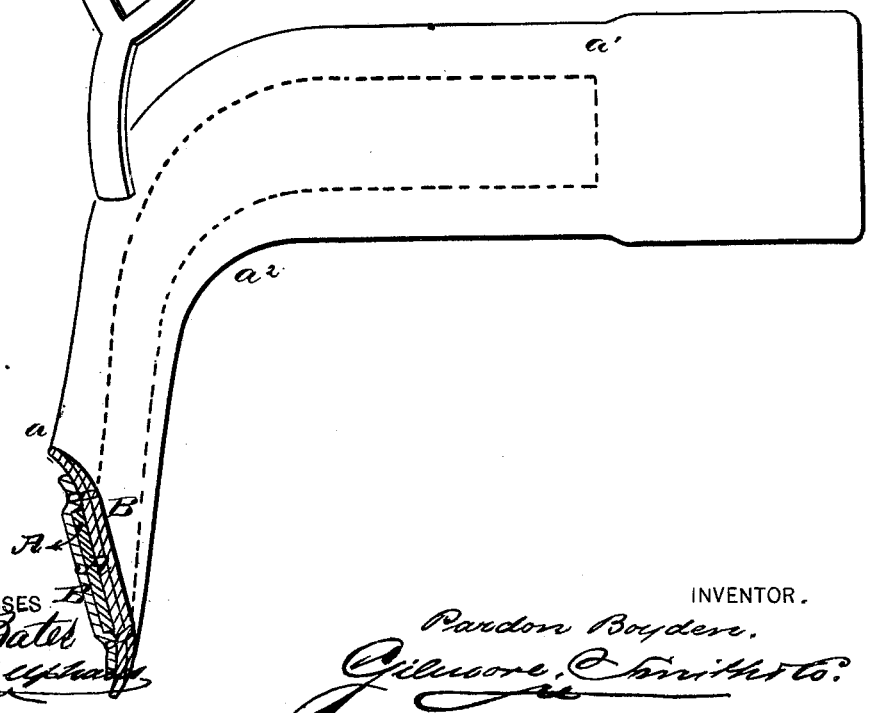

UNITED STATES PATENT OFFICE.

PARDON BOYDEN, OF AMSTERDAM, NEW YORK, ASSIGNOR TO HIMSELF AND CHARLES J. STRATTON, OF SAME PLACE.

IMPROVEMENT IN BREAST-COLLARS FOR HARNESS.

Specification forming part of Letters Patent No. 188,097, dated March 6, 1877; application filed February 3, 1877.

*To all whom it may concern:*

Be it known that I, PARDON BOYDEN, of Amsterdam, in the county of Montgomery and State of New York, have invented a new and valuable Improvement in Breast-Collars for Horses; and I do hereby declare that the following is a full, clear, and exact description of the construction and operation of the same, reference being had to the annexed drawings, making a part of this specification, and to the letters and figures of reference marked thereon.

Figure 1 of the drawings is a representation of perspective view of my breast-collar, and Fig. 2 is a central vertical sectional view thereof.

This invention consists in the employment of a flexible metal body for a breast-collar for horses, in combination with other devices, as will be hereinafter set forth.

In the accompanying drawings, A designates a metal strip or former, constituting the body of a breast-collar, having a downwardly-bent front portion, $a$, inclined so as to fit the animal's breast, and two diverging upper ends, $a^1$ $a^1$. Said parts $a$ $a^1$, in uniting, form curves $a^2$ $a^2$, which fit upon the front curves of the horse's shoulders. Said former or body A is elastic, so that it tends to resume and retain the shape above described; but it will yield to pressure or strain, so as to avoid wearing the animal's hide. Said former is indicated by dotted lines in Fig. 1, and shown in cross-section, as well as partly indicated by dotted lines in Fig. 2. B designates a leathern envelope or breast-collar proper, incasing the said former, and conforming to the shape thereof, but extending beyond its ends, where draft-buckles are attached to said collar. One of said buckles (marked $B^1$) is shown in Fig. 1. To the front of said breast-collar is attached a depending choke-strap, $B^2$, of ordinary construction, and to the upper part of said collar, near the bends $a^2$ $a^2$, a neck-strap, C, is attached. Said neck-strap consists of two pieces, $c$ $c'$, buckled over the horse's neck. D designates a leather shield, which sits under said neck-strap, and is attached thereto by means of slides or raised cross-strips $d$ $d^1$ $d^2$, of leather, through which said pieces $c$ $c'$ are slipped before buckling them. Shield D protects the horse's neck from being chafed, and also furnishes, in connection with neck-strap C, two guideways for the reins, one being on each side of middle cross-strip or slide $d^1$.

The flexibility of this collar allows it to fit any horse, and, owing to this perfect fit, the draft comes upon the shoulders directly, and not upon the breast-front or neck. It will not choke the horse, nor slip from its place, so as to bring the draft upon the points of the shoulders, or bind upon legs of the horse, so as to interfere with free action. The draft comes upon the shoulder, just as when a perfectly-fitting hame-collar is used.

The trace and trace-loop are held above the line of the shafts, thereby preventing the trace-loop and shafts from being worn.

By putting on staples for pole-straps this collar can be used for double harness, and would be especially valuable for application to horses that have been "sweenied." A pad may be added to said collar, if preferred.

What I claim as new, and desire to secure by Letters Patent, is—

The combination of flexible body A with leather envelope B, neck-strap C, and shield D, having cross-pieces $d$ $d^1$ $d^2$, substantially as and for the purpose set forth.

In testimony that I claim the above I have hereunto subscribed my name in the presence of two witnesses.

PARDON BOYDEN.

Witnesses:
 E. D. BRONSON,
 J. FRED. ACKER, Jr.